June 19, 1934.  J. J. JAKOSKY  1,963,090
APPARATUS FOR DETECTING EXCESSIVE DEVIATION OF DRILL HOLES
Filed May 13, 1929  5 Sheets-Sheet 1
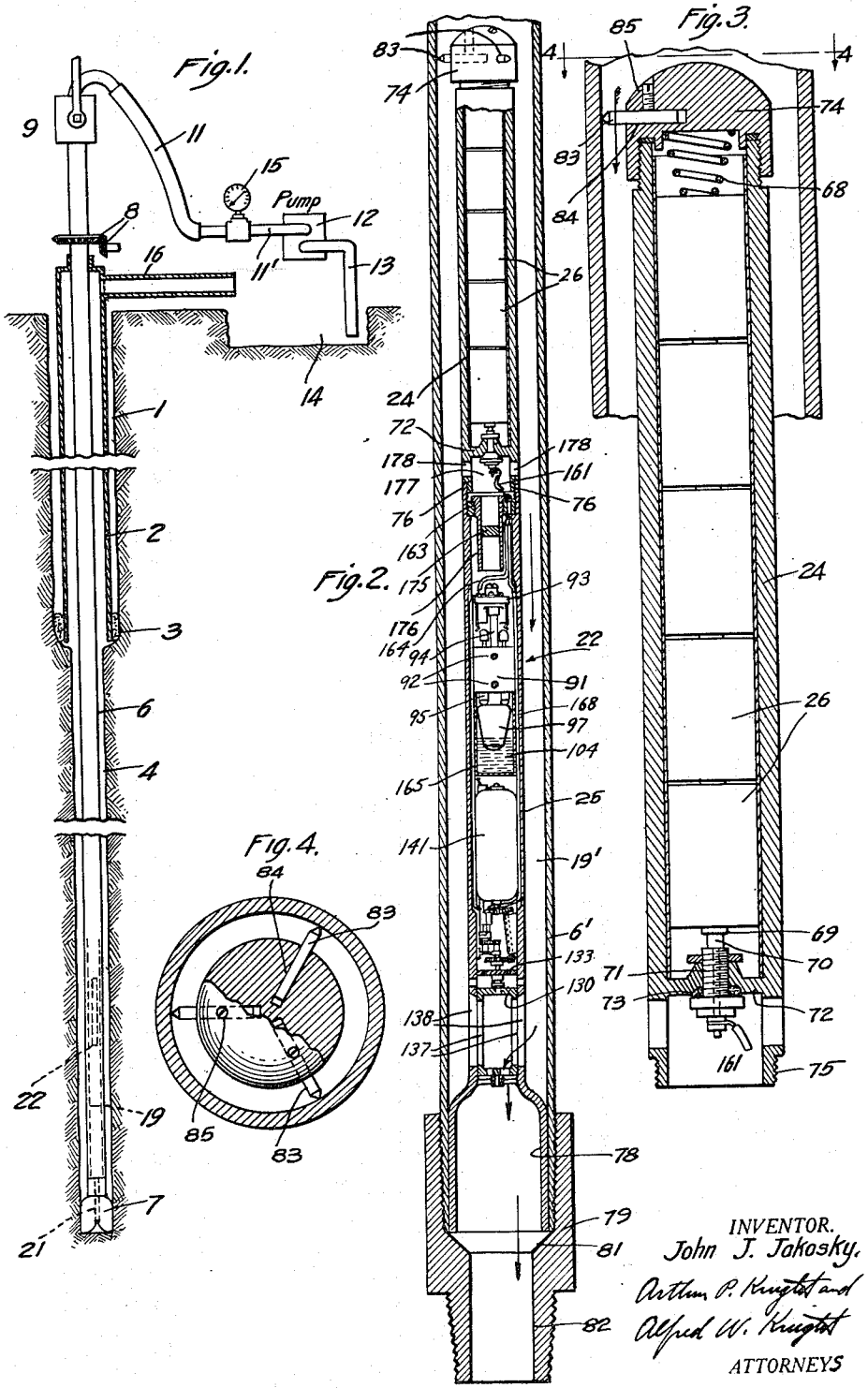
INVENTOR.
John J. Jakosky.
Arthur P. Knight and
Alfred W. Knight
ATTORNEYS

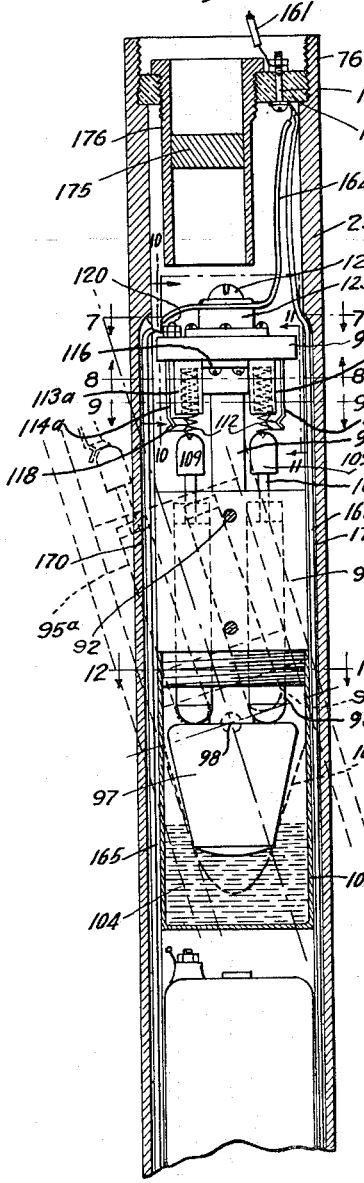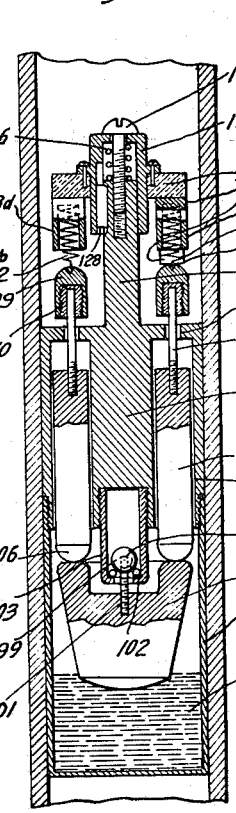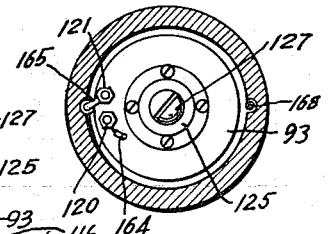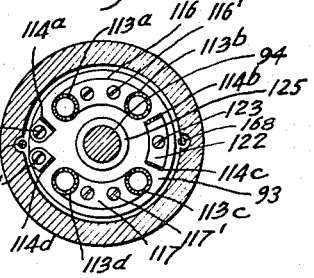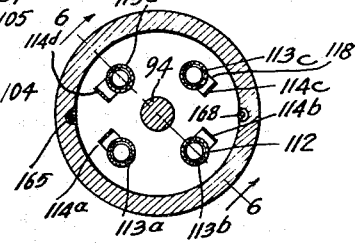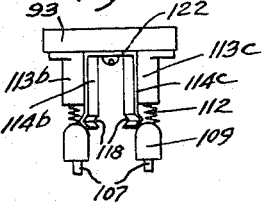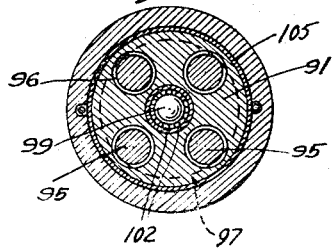

June 19, 1934.    J. J. JAKOSKY    1,963,090
APPARATUS FOR DETECTING EXCESSIVE DEVIATION OF DRILL HOLES
Filed May 13, 1929    5 Sheets-Sheet 3
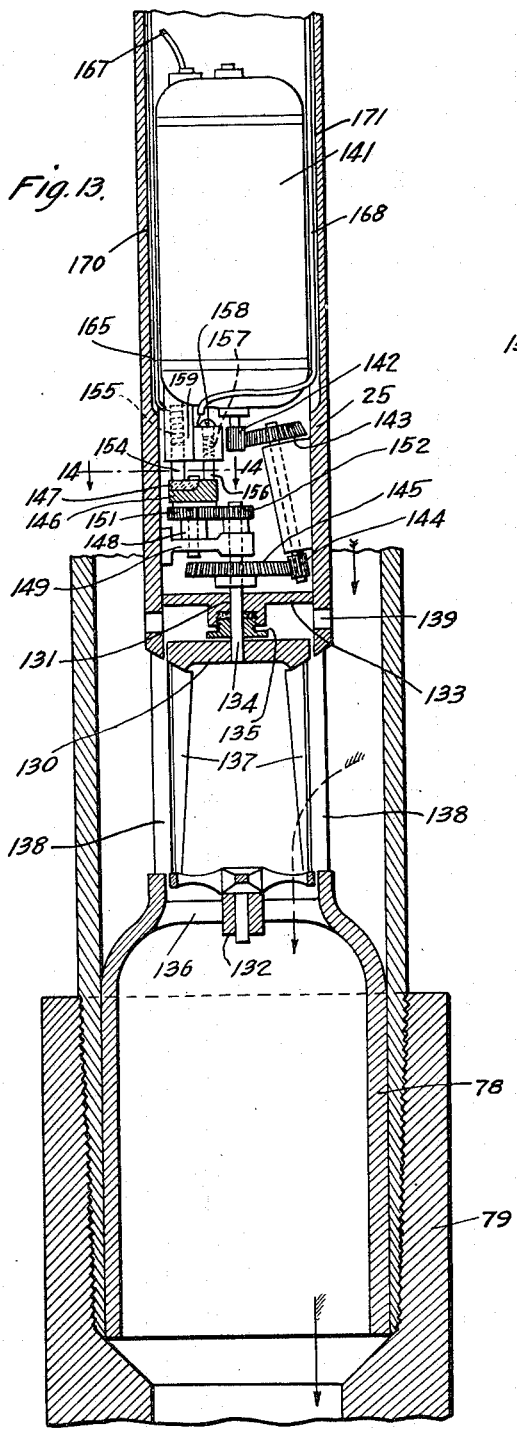
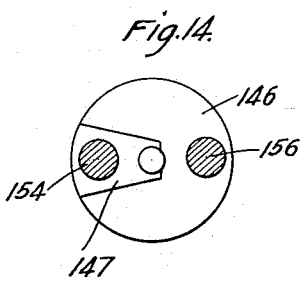
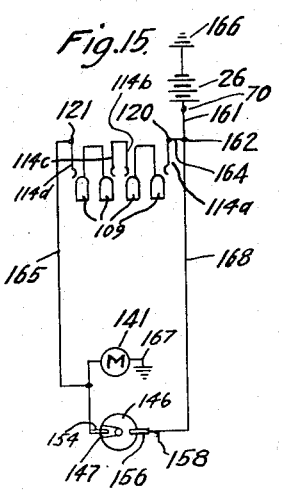
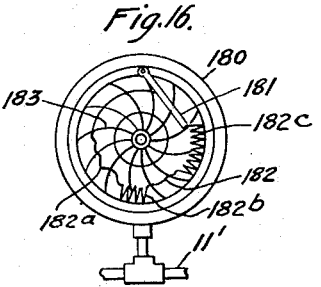
INVENTOR.
John J. Jakosky.
BY Arthur P. Knight and
Alfred W. Knight
ATTORNEYS June 19, 1934.  J. J. JAKOSKY  1,963,090
APPARATUS FOR DETECTING EXCESSIVE DEVIATION OF DRILL HOLES
Filed May 13, 1929   5 Sheets-Sheet 4
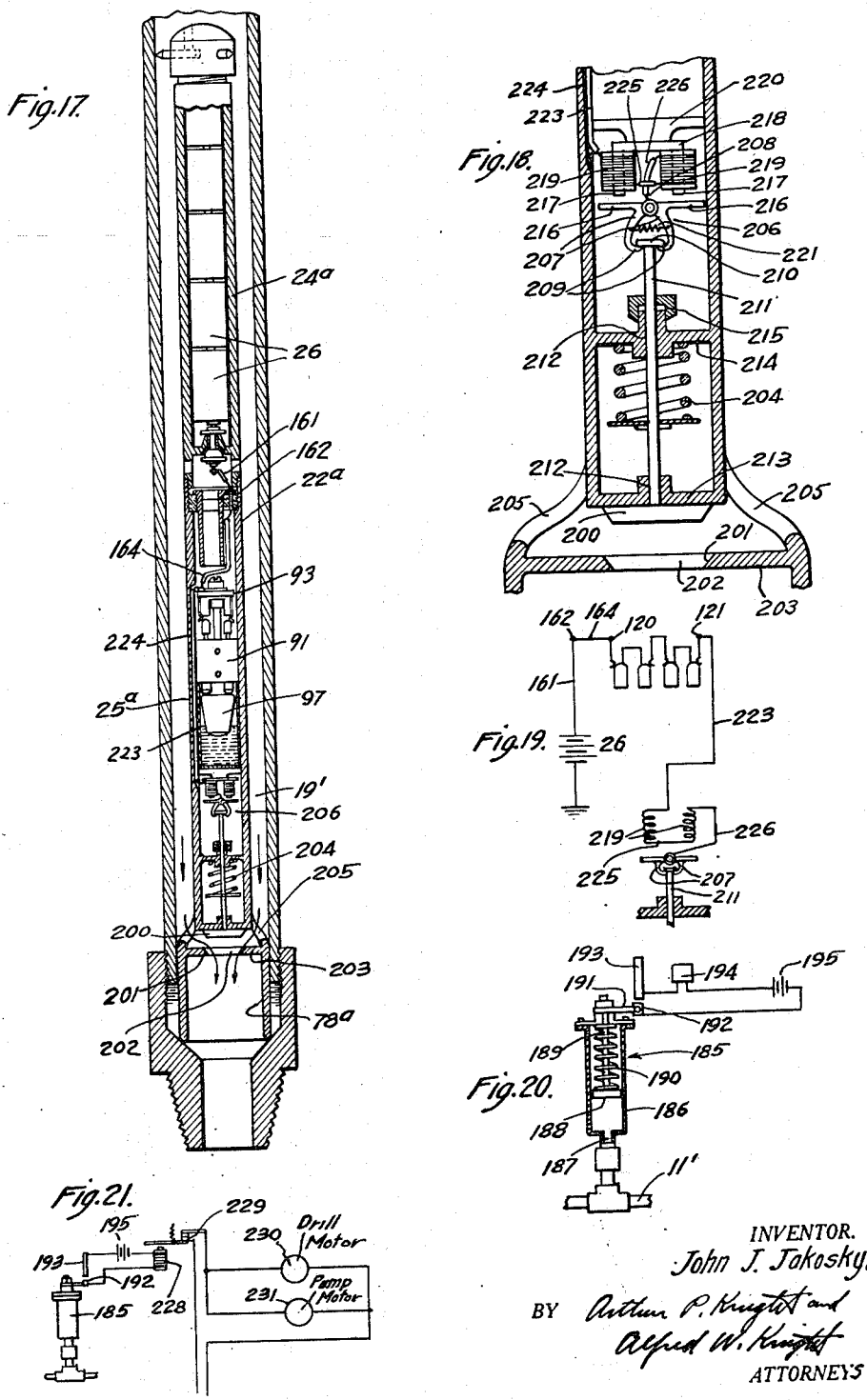
INVENTOR.
John J. Jakosky.
BY Arthur P. Knight and
Alfred W. Knight
ATTORNEYS

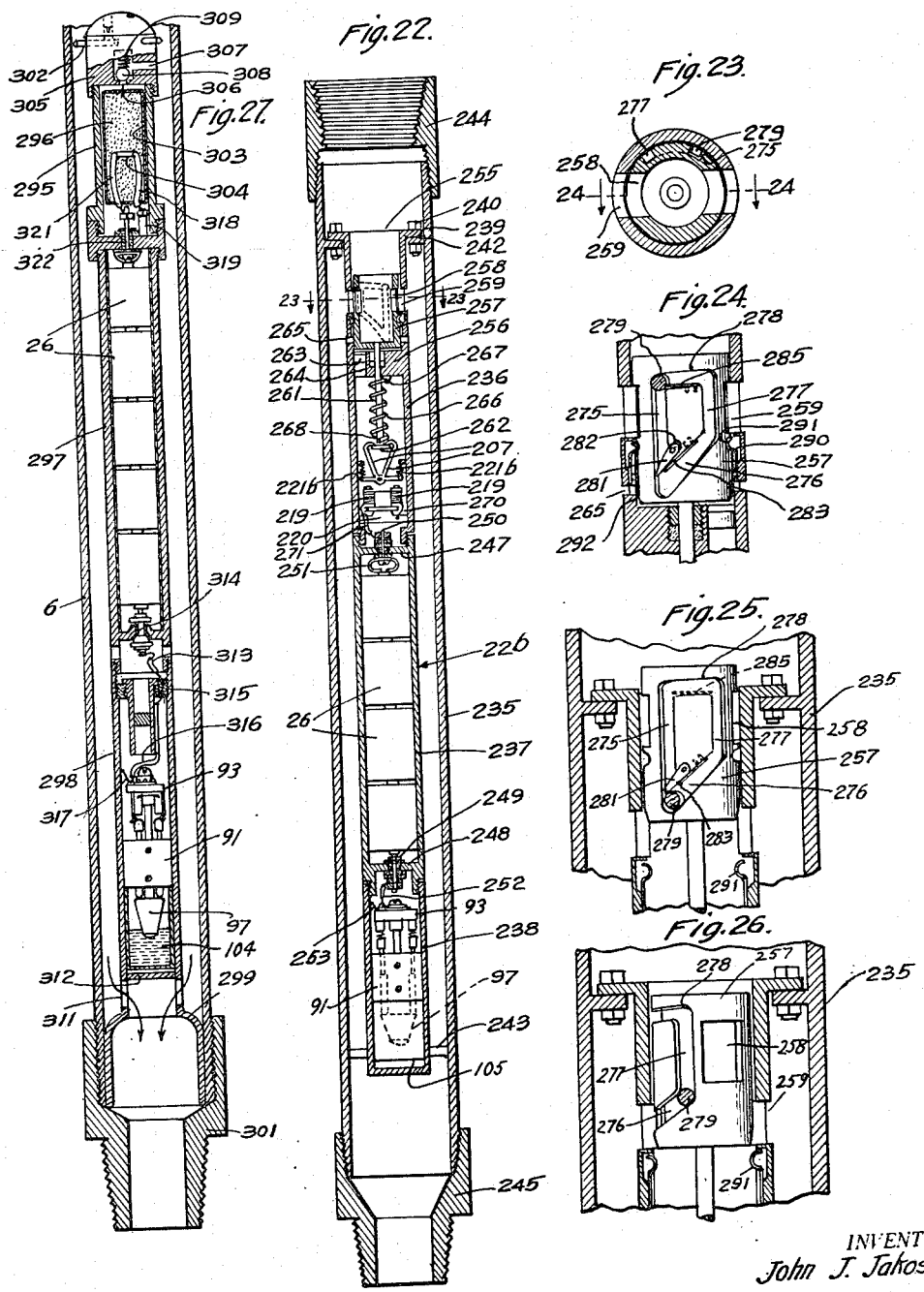
June 19, 1934. J. J. JAKOSKY 1,963,090
APPARATUS FOR DETECTING EXCESSIVE DEVIATION OF DRILL HOLES
Filed May 13, 1929 5 Sheets-Sheet 5
INVENTOR.
John J. Jakosky.
BY Arthur P. Knight and
Alfred W. Knight
ATTORNEYS Patented June 19, 1934

1,963,090

UNITED STATES PATENT OFFICE 1,963,090

APPARATUS FOR DETECTING EXCESSIVE DEVIATION OF DRILL HOLES

John J. Jakosky, Los Angeles, Calif., assignor, by mesne assignments, to J. Warren MacClatchie, doing business as MacClatchie Manufacturing Company, Compton, Calif.

Application May 13, 1929, Serial No. 362,656

24 Claims. (Cl. 255—1)

This invention relates to the drilling of bore holes, and particularly oil wells, and diamond drill holes, and the principal object thereof is to provide for giving a warning signal or indication, at the surface, whenever the angular deviation of the hole from the vertical, in any direction, exceeds a certain allowable limit.

In the rotary drilling of oil wells, diamond drill holes, or other holes into the earth, inclined structures, or masses of varying hardnesses and physical characteristics, are often encountered, and these or other reasons frequently cause the drill to be deflected from its initial vertically downward direction, thus causing the hole to deviate from the vertical, and in many cases this deviation has been found to continually increase with continued drilling, to a very undesirable extent. In an article in the Oil and Gas Journal, August 23, 1928, page 30, the following are included as some of the more important causes for crooked holes in oil well drilling operations:

"1. Excessive weight on drill bit.
2. Too rapid drilling.
3. Flexure of drill pipe caused by excessive weight.
4. Caving formations allowing excessive flexure of drill pipe.
5. Poor alignment in starting hole.
6. Bent or kinked drill pipe.
7. Unsymmetrical bits.
8. Dip, faulting, and fracturing of strata.
9. Changes in character of formations from soft to hard and hard to soft."

A further condition which has frequently been assigned as a cause of crooked holes is the excessive use of circulating fluid, leading to "hydraulicing", that is, to erosion of the hole by the high velocity of the fluid, so that the hole becomes larger than the bit and allows the bit to "wobble" or the drill pipe to flex.

Many oil well holes, because of such deviation, either enter the productive sands at points far to one side of their original goals, or entirely fail to strike these sands. Furthermore, a well started on one owner's property may deviate to such an extent as to strike the oil sands at a point directly beneath the property of some one else instead of beneath the property on which it was started, thus seriously impairing the production of another well properly belonging to the other property. Another disadvantage of this deviation is that it not only makes further drilling operations more difficult but also interferes to a considerable extent with the subsequent pumping operations.

In the above mentioned article in the Oil and Gas Journal the disadvantages resulting from crooked holes are divided into drilling troubles and production troubles. The list of drilling troubles there enumerated includes the following:

"1. Excessive depreciation of drill pipe caused by crystallization, and permanent bending and kinking of pipe. Some contractors make it a practice to use new drill pipe on every fifth hole.
2. Twisting off of drill pipe.
3. Costly fishing jobs.
4. Difficulties of fishing jobs increased by crooked holes.
5. Loss of drilling time on account of troubles here cited.
6. Sidetracking jobs.
7. Crookedness of holes increased by sidetracking jobs.
8. Difficulties in running casing in crooked holes.
9. Damage to casing caused by flexure.
10. Difficult or impossible to finish some rotary holes with cable tools.
11. In extreme cases, impossible to run cable tools through casing in crooked holes.
12. Loss of circulation through other holes where wells drift close together.
13. Line cutting of casing, especially in combination drilling.
14. Excessive wear upon drilling lines in combination drilling.
15. Collapsing of casing due to line cutting and unequally distributed stresses caused by casing flexures.
16. Excessive consumption of power because of increased friction.
17. Cost of drilling unnecessary footage due to extra length of crooked holes.
18. Time lost in drilling extra footage caused by crooked holes.
19. Damage to neighboring wells, or from neighboring wells, caused by actual intersection or through accidental mudding or cementing of one well by another. The frequently reported migration of mud fluid from one well to another is undoubtedly due to wells drifting close together in many cases.
20. Abandonment of holes caused principally by unsuccessful fishing jobs, holes drifting off structure or becoming too crooked to use and the chance intersection of one hole by another so that one of them must be abandoned.
21. Difficulty of subsurface correlations, especially in determining where to set casing to make proper water shut offs."

The production troubles enumerated by the same writer are as follows:

"1. Inadequate and misleading subsurface information.

2. Well spacing and surface locations lose their significance from a subsurface point of view.

3. Inadequate testing and drainage of productive sands.

4. Excessive wear and failure of sucker rods.

5. Rod cutting of tubing.

6. Excessive wear of pump plungers.

7. Difficulties in getting plunger to enter working barrel except where insert barrels are used.

8. Difficulty in properly counterbalanced the pump equipment in crooked holes.

9. Difficulties in swabbing caused by casing flexures and line cutting.

10. Excessive power consumption caused by friction losses in pumping wells.

11. Difficulty in running tubing catches.

12. Accentuation of fishing troubles, especially in the loss of time in recovering broken rods or parted tubing."

Means have been proposed for determining the course of an oil well or other bore hole after the same has been completed, by lowering suitable deviation indicating or recording instruments therein, but a great disadvantage of all the devices heretofore proposed is that they do not give an indication of the deviation until all the harm is done. If a dangerous or undesirable deviation, or a departure from the proper position at the depth of the oil sands, is found in a well which has been already drilled, it is necessary to re-drill the entire hole from the point at which the excessive deviation begins, this being ordinarily done by cementing the hole at this point for a sufficient height, so that upon re-drilling through the cement, a new and straighter course will be followed. Needless to say, such operations are not only expensive in themselves, but represent a still greater loss due to the delay in starting the well into regular production.

It has been found, however, that if the deviation can be detected at its inception, or before it exceeds a reasonable allowable angle, the hole may be straightened with comparative ease, by simply raising the drill a little distance and slowly re-drilling the part of the hole at which the excessive deviation began. The object of my invention, therefore, is to provide for ready detection of any excessive deviation, during the drilling operation, so as to permit the operator to take proper steps to eliminate it before the drilling has proceeded very far in the wrong direction. The amount of re-drilling may thus be reduced to a minimum, and the completion of a reasonably straight hole within the shortest possible time is made possible, in addition to insuring that the hole will strike the oil sands approximately at the point intended. The possibility of having to completely re-drill the major portion of the hole is thus eliminated.

My invention is particularly adapted for use in connection with rotary drilling operations, as distinguished from the "cable-tool" or "churn" method. In the rotary method of drilling, a suitable bit is mounted at the bottom of a string of drill-pipe extending to the bottom of the hole, and the pipe and bit are slowly rotated by means of a rotary device connected to the drill pipe above the surface. A continual circulation of fluid, commonly known as "rotary mud", is maintained through the hole, this mud being prepared by mixing a suitable clay with water to the proper consistency. The mud so prepared is pumped down through the central opening of the drill pipe and out through holes in the bit, at sufficient pressure to cause it to flow back up through the hole and around the drill pipe, to the surface, where it is collected and re-utilized.

According to my invention the circulating fluid is utilized as a means of communicating to the surface an indication of any excessive deviation of the hole from the vertical. The fundamental idea of so acting on the circulating fluid at a point adjacent the lower end of the hole, whenever the deviation thereof from the vertical exceeds a certain amount, as to give an indication of such excessive deviation at the surface, is disclosed and claimed in my United States Patent No. 1,850,399, issued March 22, 1932. The preferred apparatus for effecting such communication of the indication to the surface, as disclosed and specifically claimed in said patent, however, provides for the delivery of a quantity of suitable indicating agent to the circulating fluid adjacent the bottom of the hole in case of excessive deviation, and the detection of the presence of such indicating agent upon the return of such circulating fluid to the surface.

While the present invention is similar in some respects to that covered in said other application, and while the apparatus employed is, or may be, the same in some parts, it represents a modification in the means used for communicating the indication of excessive deviation to the surface. The communication of such indication to the surface, according to this invention, is based upon so acting on the circulating fluid adjacent the lower end of the hole, in case of excessive deviation thereof from the vertical, as to cause a sudden and material change in the resistance to flow of such fluid, such change in resistance at this point also causing a change in the head of the circulating fluid at the surface, which may be utilized in any suitable manner to give a warning of the excessive deviation, for example by means of a visual or other indication or record. A particularly advantageous means of giving an indication at the surface of the sudden change in head of the circulating fluid consists in utilizing such change in head to automatically stop the drilling apparatus, or the fluid circulating pump, or both. The change in resistance may be effected in various ways, such as hereinafter described, and the change in head at the surface may consist of a change in pressure head or velocity head. The invention also comprises certain advantageous apparatus for use in controlling the giving of an indication in response to deviation of the drill pipe, and a particular object in this connection is to prevent improper operating of the deviation-responsive means due to any tendency thereof to "gyrate" or to depart from the vertical, in case of unusually rapid rotation of the drill pipe.

A further object of the invention is to provide means whereby the indication or warning given at the surface, due to excessive deviation of the drill pipe, may readily be distinguished from a false indication which might be given as a result of accidental operation of the apparatus due to some other cause, as hereinafter described.

A further object of the invention is to provide advantageous means for adjusting the control means so as to render the apparatus sensitive to any desired amount of deviation of the drill pipe.

One form of apparatus of this invention comprises essentially valve means mounted within the drill pipe adjacent the lower end thereof and operable to vary or control the resistance to flow of liquid therethrough, means normally holding said valve means in position to permit relatively free flow therethrough, means for operating said valve means to position to interpose a relatively high resistance to liquid flow therethrough, and deviation responsive means adapted to cause operation of said valve operating means whenever the deviation of the drill pipe from the vertical exceeds a certain angle. The valve means may be the "cut-off" type, that is, adapted to completely obstruct passage of fluid therethrough, or it may be adapted to only partially obstruct such passage. Furthermore, the operating means therefor may be adapted to repeatedly close and open said valve, or to close the valve and leave it closed, producing in the one case a repeated variation in pressure and in the other case a permanent increase in pressure.

A preferred form of valve means and operating means therefor is one which is adapted to be repeatedly closed and opened, so as to cause a series of pulsations in the pressure or head of the circulating fluid, so long as the deviation responsive control means remains in operative condition, that is, the condition in which it is placed by excessive deviation of the drill pipe, but is adapted to return to normal open position and remain there, if the operative condition of the deviation responsive means is only momentary, as in case of accidental operation thereof.

Instead of employing valve means to produce the change in resistance to flow of the circulating fluid, other means may be employed for this purpose. For example, means may be provided for suddenly introducing into the circulating fluid another fluid under pressure, thus increasing the back pressure in the drill pipe.

In a preferred form of my apparatus, the deviation responsive means comprises a weight or bob supported within a suitable housing inside the drill pipe, so as to swing freely about its point of support which is located above its center of gravity, whereby said weight will always tend to maintain a position with its center of gravity directly beneath said point of support; and control means having control elements disposed about the axis of said weight and adapted to be operated thereby so as to cause operation of means for increasing the pressure in the circulating fluid, such as the valve operating means aforesaid, whenever the deviation of the drill pipe from the vertical exceeds a certain predetermined angle. Said control means may comprise, for example, electric contact means connected in an electric circuit associated with the valve operating means, and control elements operable by the weight or bob, upon a certain relative deviation of the pipe with respect to said weight or bob, for closing connection between said contact means. In order to prevent operation of the valve means upon accidental momentary relative movement of said weight with respect to the housing, as in case of a swinging movement imparted to said weight due to sudden jarring or vibration, I prefer to provide an arrangement, as hereinafter described, whereby relative deflection of said weight from the direction of the axis of the hole must be maintained for a certain period of time, or during one or more complete revolutions of the drill pipe and bit, before operation of the valve means will be effected.

The normal speed of rotation of the drill in rotary drilling operations is relatively slow, so that there is normally little, if any, tendency for the weight or bob to gyrate or swing outwardly from its vertical axis, due to centrifugal force thereon. However, it sometimes occurs that the speed of rotation is momentarily increased, due for example to sticking or wedging of the bit, followed by release thereof and sudden rotation for a few turns until the normal speed is again restored. Under such conditions of increased speed of rotation there may be a tendency for the weight or bob to gyrate or swing outwardly from its vertical axis by reason of centrifugal action, and the preferred form of apparatus also includes means operable upon excessive speed of rotation of the drill pipe to resist or damp relative deviation of the weight or bob from the axis of the drill pipe and thus prevent improper operation of said control means due to such gyration or swinging movement of the weight or bob.

The above described apparatus including the valve means, or other means for causing increased pressure in the circulating fluid, the operating means therefor, and the deviation responsive control means, is preferably mounted inside the drill pipe or in a special pipe section connected into and forming in effect a part of the drill pipe, in such manner as to leave room for passage of the circulating fluid around or through the same. This insures substantial alignment of the apparatus with the drill pipe at all times, protects the apparatus from damage by contact with objects outside the drill pipe, and permits positive control of the pressure at the upper end of the drill pipe by operation of said valve means or other pressure increasing means.

The accompanying drawings illustrate the apparatus and method of my invention and referring thereto:

Fig. 1 is a vertical section of a bore hole with a rotary drilling apparatus in place therein and provided with means according to my invention for indicating excessive deviation thereof from the vertical.

Fig. 2 is a vertical section of a portion of the drill pipe adjacent the lower end thereof, with the deviation detecting apparatus mounted therein.

Fig. 3 is an enlarged vertical section of the upper portion of the deviation detecting apparatus showing the electric current supply means for operation of the valve means.

Fig. 4 is a horizontal section on line 4—4 in Fig. 3, with the top of the detecting apparatus partly broken away.

Fig. 5 is a vertical section of the deviation responsive control element of the apparatus shown in Fig. 2.

Fig. 6 is a vertical section on line 6—6 in Fig. 9.

Fig. 7 is a horizontal section on line 7—7 in Fig. 5.

Fig. 8 is an inverted horizontal section on line 8—8 in Fig. 5.

Fig. 9 is a horizontal section on line 9—9 in Fig. 5.

Figs. 10 and 11 are vertical sections on lines 10—10 and 11—11 respectively in Fig. 5.

Fig. 12 is a horizontal section on line 12—12 in Fig. 5.

Fig. 13 is a vertical section of the valve means and of electrically controlled operating means therefor.

Fig. 14 is a horizontal section on line 14—14 in Fig. 13.

Fig. 15 is a wiring diagram of the apparatus.

Fig. 16 illustrates the use of a recording pressure gauge for measuring the variations in pressure in the circulating fluid.

Fig. 17 is a vertical section of a modified form of apparatus.

Fig. 18 is an enlarged vertical section of the valve operating means in the form of apparatus shown in Fig. 17.

Fig. 19 is a wiring diagram of the apparatus shown in Fig. 17.

Fig. 20 illustrates a pressure responsive device which may be used in connection with either of the above described forms of pressure increasing means, for giving a visible or audible signal when the pressure in the circulating fluid increases due to operation of the valve means.

Fig. 21 is a diagrammatic illustration of means for utilizing a pressure responsive switching device such as shown in Fig. 21 for shutting off the electric motors which operate the drill and the pump for circulating the fluid.

Fig. 22 is a vertical section of another modified form of deviation detecting apparatus, and also illustrating the mounting of such apparatus in a special pipe section.

Fig. 23 is a horizontal section on line 23—23 in Fig. 22.

Fig. 24 is a section on line 24—24 in Fig. 23.

Fig. 25 is a view similar to Fig. 24, showing the valve member in an intermediate position in its operation.

Fig. 26 is another similar view with the valve in another intermediate position.

Fig. 27 is a vertical section of another modified form of deviation detecting apparatus.

Referring to Fig. 1, a bore hole is shown, comprising an upper portion 1 of relatively large diameter provided with a string of casing 2 cemented off at its lower end in the usual manner as shown at 3, and a lower portion 4 of somewhat smaller diameter. The drilling apparatus is shown as comprising a string of rotary drill pipe 6 having a bit 7 at the lower end thereof and provided at its upper end with bevel gear means 8 for effecting rotation thereof at any usual or suitable speed. The upper end of the drill pipe is connected through the usual swivel 9 and flexible hose 11 to a pump 12 whose inlet pipe 13 leads to a sump or other storage means 14 in which is provided a supply of mud or fluid of proper consistency for circulation through the pump. A pressure gauge 15, shown in this case as being of the indicating type, may be connected to the pipe 11' between flexible hose 11 and pump 12. From the upper end of casing 2, a pipe 16 leads to storage means 14. It will be understood, of course, that the drill pipe is provided with an internal passage for down-flow of fluid throughout its entire length, the lower portion of said passage being indicated in dotted lines at 19, and the drill bit 7 is provided with one or more passages 21 communicating with the lower end of passage 19 for permitting outflow of fluid adjacent the cutting edges or faces of the bit.

According to my invention a deviation detecting apparatus 22 is mounted adjacent the bit or the lower portion of the drill pipe, and said apparatus is shown in this case as mounted within the interior passage 19 of a section of the drill pipe and as near the lower end of such drill pipe as is convenient, for example in some such position as indicated in dotted lines in Fig. 1.

The deviation detecting apparatus 22 is shown as comprising a vertically elongated housing of general cylindrical shape and formed of two sections of tubing 24 and 25. The upper housing section 24 contains a source of electric current, comprising for example a suitable number of small dry cells 26, which may be of the same type as are commonly used in pocket flash lights, placed end to end therein with their terminals in contact with one another. The number of said dry cells is sufficient to produce the required current for effecting operation of the pressure increasing means as hereinafter described, it being understood that the tubing section 24 may be made of sufficient height to receive any desired number of such cells. A sleeve 27 of insulating material may be provided between said dry cells and the metallic walls of the casing. The upper terminal of the uppermost dry-cell makes electrical contact with a contact spring 68, while the lowermost terminal 69 of the series of dry cells makes contact with the head of a binding post 70 which extends through an insulating bushing 71 in the lower end wall 72 of section 24. Packing means 73 may be provided for preventing leakage of fluid around the bushing 71. The upper end of housing section 24 may be closed by a cap member 74, while the lower end thereof may be externally threaded as at 75 for engagement with an internally threaded portion 76 at the upper end of the lower housing section 25. Said lower housing section contains the deviation responsive means and valve operating means which will be described more fully hereinafter.

The deviation detecting apparatus may be mounted within the drill pipe in any suitable manner so as to maintain the same in substantially rigid position therein and with its axis in substantial alignment with the axis of the drill pipe. The external diameter of the detecting apparatus is somewhat smaller than the internal diameter of the drill pipe, so that it may be mounted in the passage 19 of the drill pipe without completely filling the same, thus leaving an annular space as indicated at 19' in Fig. 2 for passage of the circulating fluid past the apparatus. The lower end of the lower casing section 25 may be flared outwardly as shown at 78 so as to engage, and make a substantially fluid tight fit with, the wall of the drill pipe. This enlarged portion 78 not only serves to center the lower end of the apparatus with respect to the drill pipe, but also supports the apparatus therein by engagement with a tool joint connecting together adjacent sections of drill pipe. For example, in Fig. 2 a joint or section of drill pipe is indicated at 6' and the "pin" member 79 of the usual tool joint is shown as secured to the lower end thereof. The enlarged portion 78 of the detecting apparatus then rests upon the beveled internal face portion 81 of said tool joint member. The detecting apparatus is thus kept up away from the opening 82 through the tool joint so as to leave this opening free at all times. The upper end of the detecting apparatus may be centered by means of a plurality of radially extending arms 83 preferably pointed at their outer ends and slidably mounted in recesses 84 in cap member 74 so as to be adjustable inwardly and outwardly and provided with means such as set screws 85 for holding the same in any position of adjustment.

The deviation responsive control means is shown as comprising a cylindrical support 91 secured within the lower housing section 25 in any suitable manner as by means of pins 92, an insulating support 93 of bakelite or other suitable material adjustably mounted upon a central post 94 extending upwardly from support 91, a plurality of plungers 95 slidably mounted in chambers 96 in the support 91, a weight or bob 97 mounted to swing freely beneath said support and engaging the lower ends of plungers 95, suitable contact means mounted upon insulating support 93, and means carried by plungers 95 for closing connection between said contact means upon operation of said plungers by the weight 97. The point of support 98 of weight 97 is above its center of gravity so as to cause said weight to always tend to assume and maintain a position such that its center of gravity is directly below said point of support, regardless of tilting of the remainder of the apparatus. Said weight may be supported in any suitable manner, for example, by means of a ball 99 connected thereto by pin 101 and resting upon ball bearings 102 mounted in a retaining member 103 secured to support 91. An important function of the ball bearings 102 is to minimize the friction between ball 99 and the relatively fixed retaining member 103 and thus minimize the tendency for weight 97 to be rotated with the rest of the apparatus, upon rotation of the drill pipe. Such rotation of the weight 97 would be objectionable as it might tend to produce swinging or gyration of the weight about its point of support in case of rapid rotation of the drill pipe. In order to still further prevent such gyration or outward swinging of weight 97 by reason of centrifugal action thereon, I prefer to provide, beneath and around the lower portion of said weight, a body of a suitable heavy damping liquid, such as mercury, indicated at 104. Said liquid may be contained in a cup shaped receptacle 105 secured to the lower end of support 91. The amount of heavy liquid placed in said receptacle should be sufficient to give the desired damping action as hereinafter described.

Any suitable number of plungers 95 may be provided for closing connection between corresponding contact means, but I prefer to provide a plurality of said plungers and contact means, disposed at different angular positions about the axis of weight 97, so that by connecting said contact means in series in the control circuit, the momentary closing of any one of said contact means due to raising of one of said plungers, as for example, due to accidental swinging of weight 97 to one side or the other, will not completely establish the control circuit. In the present instance I have shown four plungers 95 mounted 90° apart in the support 91. The lower ends of said plungers are preferably rounded as shown at 106 so as to minimize the sliding friction between said plungers and weight 97. Suitable means are provided for permitting flow of fluid into or out of cylinders 96 above the plungers 95. For this purpose said plungers may be made to fit loosely in said cylinders, thus permitting flow of fluid between the plungers and the walls of the cylinders. Each of said plungers is also provided with a rod or stem 107 extending upwardly through an opening 108 in support 91 and provided at its upper end with a knob or head 109 insulated therefrom as by means of an insulating sleeve 110. Each of the plungers 95 with its knob 109 constitutes a circuit closing member.

The contact means controlled by said circuit closing members may comprise contact springs 112 held in sleeves 113a, 113b, 113c and 113d depending from the insulating support 93 and resilient contact arms 114a, 114b, 114c, and 114d also depending from said insulating support. Each of the springs 112 rests at its lower end in a small recess 115 in the top of one of the knobs 109, the force of said spring being sufficient to resiliently hold the same in said recess, but insufficient to exert any appreciable force opposing the upward movement of said knob as hereinafter described. The sleeves 113a and 113b are electrically connected together, for example, by means of an arc shaped strip 116 formed integrally therewith and secured beneath insulating support 93 as by means of screws 116', while sleeves 113c and 113b may be similarly connected by means of strip 117 secured by screws 117'. Each of the resilient contact members 114a etc. extends downwardly somewhat to one side of one of the circuit closing knobs 109 and is provided adjacent its lower end with a portion 118 projecting inwardly toward said knob. The projecting portions 118 of said contact arms are normally above and out of contact with the corresponding knobs 109 but are adapted to be engaged thereby upon raising of said knobs as hereinafter described. The contact arms 114a and 114b may be separately mounted upon insulating support 93 as by means of binding posts 120 and 121 respectively, while the contact arms 114b and 114c may be electrically connected together as by means of a conducting strip 122 formed integrally therewith and secured beneath insulating support 93 as by means of screw 123.

Adjustment of said contact means, so as to vary the required raising of knobs 109 and consequently the required shifting of weight 97 due to deviation of the drill pipe, for effecting closing of the connection between said contact means, may be provided by adjustably mounting the insulating support 93 on the central post 94, whereby adjustment thereof will adjust all of the contact members equally and simultaneously. Adjustment of said insulating support may be provided by securing the same to a sleeve 125 which slidably surrounds the upper end of post 94. A spring 126 resiliently holds sleeve 125 upwardly against the head of screw 127 which is threaded into post 94. By adjusting the screw 127 upwardly or downwardly any desired adjustment of the contact means relative to the circuit closing members may be effected. Sleeve 125 may be keyed to post 94 as indicated at 128 so as to prevent relative turning thereof and maintain the contact members in proper angular positions relative to the respective circuit closing members. It will be seen that at the time of assembling the detecting apparatus, and before the same is mounted within the drill pipe to be lowered into the well, the tube 176 may be unscrewed from the end wall 163 and a screw-driver inserted through the opening thus provided, and screw 127 may then be adjusted to give the desired relative positions of the contact members 114a etc. with respect to the circuit closing knobs 109. By thus adjusting the amount of upward movement of knobs 109 required to effect engagement thereof with said contact members, the apparatus may be made responsive to any desired amount of angular deviation of the drill pipe.
The means for controlling resistance to flow of circulating fluid may comprise a rotary valve member 130, rotatably mounted in upper and lower bearings 131 and 132, the upper bearing being provided by a horizontal wall 133 closing off the interior of the housing section 25 above the same. The shaft 134 of said valve member extends through a stuffing box 135 so as to prevent flow of liquid into or out of the space above partition wall 133. The lower bearing 132 may be mounted upon a spider having openings 136 for passage of circulating fluid. Valve member 130 is provided with two diametrically opposed openings or ports 137 adapted to register with corresponding openings or ports 138 in the wall of housing section 25 when the valve member is in its normal position of rest. It is seen that when the valve is in this position the circulating fluid may pass freely through openings 138, 137 and 136 so that but little resistance to the flow of such fluid is offered by the detecting apparatus. Openings 139 may be provided if desired for admitting circulating fluid above the valve member 130 so as to insure equality of pressure on both sides of the upper end portion of said valve.

Within the housing section 25 and between partition wall 133 and the deviation responsive control means, is mounted an electric motor 141 of the type adapted for operation when completely immersed in a liquid such as a suitable oil. Said motor is connected through suitable speed reducing gear means indicated at 142, 143, 144 and 145 to the shaft 134 of valve member 130. A limit switch or commutator is also provided for said motor, consisting for example of a metal disc 146 having a segment 147 of insulating material. Commutator disc 146 is rotatably mounted in bearing means 148 on an insulating support 149 and is operatively connected to shaft 134 by means of insulating gear members 151 and 152. The ratio of gear members 152 may be such as to give any desired number of rotations of valve member 130 for each rotation of the commutator disc 146. In this case I have shown the gear member 151 as having a diameter twice as great as gear member 152 so that upon each operation of motor 141 the valve member 130 will make two complete revolutions before operation of the limit switch. Said limit switch may further comprise a brush 154 resiliently held by spring 155 in engagement with the surface of disc 146 and connected to one terminal of motor 141, and a second brush 156 resiliently held by spring 157 in engagement with said commutator disc and electrically connected to a binding post 158. The members 154 to 158 inclusive may be mounted in suitable insulating means 159 secured to the motor housing.

The electrical circuit for the apparatus is shown diagrammatically in Fig. 15 and comprises a wire 161 leading from one side of battery 26, or from binding post 70 to the binding post 162 mounted in an insulating partition member 163 closing the upper end of housing section 25, wire 164 leading from said last named binding post to the binding post 120, and a wire 165 leading from the other binding post 121 to one terminal of motor 141. The circuit is completed by electrically grounding the other side of battery 26 to the metallic casing of the apparatus as indicated at 166 in Fig. 15, said ground connection being provided in the present case by spring contact 68, and electrically grounding the other side of motor 141 to said casing as indicated at 167. An additional circuit is also provided through the limit switch, by means of wire 168 leading from binding post 162 to binding post 158 connected to brush 156. The wires 165 and 168 may be carried past the deviation responsive control means in vertical grooves 170 and 171 respectively in the casing. All of the wires aforesaid may be insulated in any suitable manner.

The space inside the casing section 25 between the partition walls 133 and 163 is preferably completely filled with a non-conducting and lubricating liquid of suitable viscosity, for example, a mineral oil. Said liquid completely fills the space both below and above motor 141, the interior of receptacle 105 with the exception of the space occupied by the mercury therein, the cylindrical chambers 96, and the space above the supporting member 91. Such liquid serves not only to lubricate all of the parts immersed therein and insure free movement thereof, as well as to prevent sparking between the contact members, but also interposes a certain resistance to displacement thereof from the cylinders 96 upon application of a lifting force to the plungers, as hereinafter described. In order to maintain the pressure inside the casing equal to the pressure in the circulating fluid surrounding the same I prefer provide suitable pressure equalizing means comprising, for example, a plug 175 making a snug sliding fit within a tube 176 open at both ends and extending through the upper partition wall 163. The upper end of tube 176 opens into the space 177 between partition wall 163 and the lower end wall 72 of the battery containing section 24. The wall of section 24 is provided with openings 178 for passage of circulating fluid therethrough into space 177. As the pressure in the circulating fluid increases, as the drill reaches greater and greater depths, the plug 175 will be pushed down slightly in tube 176 so as to maintain an equal pressure at both sides thereof. However, since the interior of casing section 25 is completely filled with a liquid medium which is substantially incompressible the actual movement of plug 175 will be very small and only sufficient to maintain equalization of pressure.

The manner in which the above described apparatus operates to give an indication of excessive deviation of the bore hole from the vertical is as follows:

With the detecting devices 22 in position in the drill pipe, the drilling operation proceeds in the usual manner, accompanied by continual circulation of rotary mud or fluid from sump 14 through pipe 13 to pump 12, thence through flexible hose 11, swivel 9, downwardly in the internal passage 19 of the drill pipe and through the annular space 19' around the detecting device, out through the passage means 21 in the bit, then upwardly through the bore hole 4 and casing 2, outside the drill pipe, and finally through pipe 16 back to the sump. So long as the bore hole remains substantially vertical, or does not deviate from the vertical beyond a certain allowable angle, the electric control circuit of the detecting device remains broken between the several pairs of contact members above described.

However, in case of deviation of the bore hole from the vertical in any direction, the drill pipe, and hence the detecting device located therein, will also deviate from the vertical as indicated for example in dotted lines in Fig. 5. As the weight 97 tends to always maintain a vertical position, that is to say, with its center of gravity directly beneath its point of support 98, a lifting force will be exerted by said weight upon each of the plungers 95 when said plunger reaches a position as indicated at 95a in Fig. 5 during rotation of the device, and as the device is continually rotated with the drill pipe due to engagement of the arms 83 and the enlarged portion 78 with the interior surface of the drill pipe, such lifting force will be exerted in turn upon each of said plungers. Upward movement of said plungers, however, is resisted by the oil or other liquid in the cylinders 96 above the plungers, and the rate of such upward movement under the lifting force of the weight is determined by the rate at which liquid can escape from said cylinders, around the plungers and around the stems 107 thereof. The clearance around said plungers and stems is preferably so designed, in relation to the upward force exerted thereon by the weight, that an appreciable time will be required for such upward force to move any one of the plungers upwardly far enough to close the circuit between the corresponding contact members, so that a single or momentary upward force or impulse delivered to said plungers, as in the case of accidental swinging or vibration of the weight, will be insufficient to effect such lifting of the plungers. Furthermore, even if such sudden swinging of the weight should be of sufficient strength to raise one of the plungers sufficiently to close connection between the corresponding contact members, the control circuit would still remain uncompleted at the contact members corresponding to the other plungers. However, in case of actual deviation of the drill pipe and the detecting device from the vertical, during the drilling operation, each plunger is subjected to a lifting action during each rotation of the drill pipe, and as the mass of weight 97 is relatively large in proportion to the mass of each individual plunger 95, each plunger will be unable to return by its own weight to its original position during a rotation of the drill pipe between successive upward impulses, such return movement of the plungers being also resisted by the liquid surrounding the same. Said plungers will, therefore, remain in raised or partially raised position throughout a revolution of the apparatus, as shown for example at 95b in Fig. 5 so that eventually all of the plungers will be raised to and simultaneously held in such position that the circuit closing knobs 109 thereof engage the projections 118 of the corresponding contact arms 114a etc., thus simultaneously closing all of the normally open breaks in the control circuit.

When the control circuit is completed as above described electric current will be supplied to motor 141 through a circuit leading from the bottom terminal 69 of dry cells 26, through binding post 70, wire 161, binding post 162, wire 164, binding post 120, thence in series through the several contact members and circuit closing knobs 109 above described to the binding post 121, and through wire 165 to motor 141, thence through connection 167 to the metallic casing of the apparatus and back through said casing to contact spring 68 and to the upper end of the dry cells 26.

Motor 141 therefore operates through gears 142, 143, 144, and 145 to rotate valve 130 and move the ports 137 out of register with the ports 138, thus obstructing the flow of circulating fluid, either partially or totally according to whether or not clearance is provided between the valve member and the portion of the casing in which it rotates. This increase in resistance to flow of the circulating fluid will cause a corresponding increase in pressure at the upper end of the drilling apparatus, which will be indicated by the pressure gauge 15, and the increased pressure indication thereof will afford a readily observed indication of the deviation of the drill pipe. So long as the above described circuit of motor 141 remains established, valve 130 will continue to rotate and will bring the ports 137 alternately into and out of register with ports 138, thus alternately increasing and decreasing the resistance to flow of the fluid and hence the pressure as indicated by pressure gauge 15, and the resulting repeated fluctuations in pressure will afford an unmistakable indication that the well is going crooked, whereupon the proper steps may be taken to remedy the deviation before it has progressed to such a point as to make the correction difficult or expensive.

It is possible that even with the precautionary devices with which the apparatus is provided, accidental completion of the motor circuit might occur in cases where there was no deviation, but such accidental completion could be only momentary and would therefore give only a few fluctuations in pressure instead of the continually repeated fluctuations accompanying proper functioning of the detecting device. However, in order to prevent stopping of motor 141 in such position as to leave valve 130 in closed or partially closed position, I prefer to provide the limit switch means above described. By reference to Figs. 13, 14 and 15 it will be seen that during the first part of the rotation of the valve the insulating segment 147 of the limit switch disc 146 will be moved away from beneath brush 154, whereupon an auxiliary circuit for the motor is completed, leading from the binding post 162 of the circuit traced above through wire 168 to brush 166 and thence through limit switch disc 146 and brush 154 to the motor. Such circuit will remain established until the limit switch disc makes one complete revolution and the insulating segment 147 is again brought into position beneath brush 154, and with the above mentioned gear ratio of 2 to 1 the valve 130 will make two complete revolutions during this time. Therefore, even if the main control circuit should be interrupted after the motor has started operation, the above mentioned limit switch will always cause motor 141 to operate long enough to bring the valve back to open position.

The body of mercury or other damping liquid 104 normally has substantially no effect on the normal operation of weight 97, since such weight is not normally immersed therein sufficiently to prevent said weight from maintaining its true vertical position, and the normal speed of rotation of the drill pipe is insufficient to cause any very great displacement of the surface of the mercury from the horizontal as shown in Fig. 5. However, in case of unusually rapid rotation of the drill pipe for a short period, as in case of wedging of the drill followed by sudden release thereof, the resulting centrifugal force on the body of damping liquid will cause the same to tend to move outwardly in the receptacle 105 so that its upper surface will assume some such position as indicated in dotted lines at 104' in Fig. 5. The mercury in this position will form a dense liquid medium whose inner surface surrounds the position occupied by weight 97 and will tend to resist any displacement of said weight from its central position with respect to the drill pipe, and will thus prevent tendency of the weight to wobble or gyrate due to rotary motion imparted thereto by the high speed of rotation of the drill pipe. Accidental raising of the plungers to circuit closing position under such conditions of increased speed or rotation is thus effectively prevented.

Other means may be employed instead of the indicating pressure gauge 15 for measuring or detecting the increase in pressure in the circulating fluid due to the increased resistance to flow thereof. For example, as shown in Fig. 16, a recording pressure gauge 180 may be connected to the pipe 11' leading from pump 12 to flexible hose 11. Said recording gauge may be of any suitable type, having scribing means 181 for tracing a curve such as 182, giving a record of the pressure throughout a given interval of time, on the chart 183. The pressure curve recorded by such a gauge may normally undergo slight irregular fluctuations due to variations in the resistance normally offered to flow of the circulating fluid, such normal fluctuations in the curve being indicated for example at 182a. In case of accidental closing of the motor circuit, the operation thereof to give only two revolutions of the valve 130 before the limit switch 146 functions to open the motor circuit, might produce four sharp increases in pressure, indicated by the sharp humps in the curve at 182b, but the fact that these humps did not continue would indicate that this operation of the valve was accidental and did not denote actual deviation of the drill pipe. A series of regularly repeated sharp pumps, however, such as shown at 182c, would clearly indicate that the valve 130 was in continuous operation due to permanent closing of the main control circuit and would hence clearly indicate that the drill was going crooked and that steps should be taken to correct the same.

Another means which may be employed for indicating or detecting the fluctuations in pressure in the circulating fluid is illustrated in Fig. 20. In this case a pressure operated switch device 185 is connected to the pipe 11' above mentioned, said switching device comprising a cylinder 186 communicating with pipe 11' through pipe 187, a piston or plunger 188 mounted in said cylinder and having a stem 189 projecting through the upper end thereof, and a spring 190 tending to hold plunger 188 downwardly, said spring being of sufficient strength to counter-balance the pressures normally existing in pipe 11'. Upon the upper end of stem 189 is mounted an arm 191 provided with a contact member 192 which is normally out of contact with a contact strip 193 but is adapted to make contact therewith upon upward movement of plunger 188. The contact means 192 and 193 may be adapted to control the electric circuit for any suitable signal or indicating device, such as an electric light or for example an electrically operated bell 194. Said signal may be operated by any suitable source of power such as battery 195. It is evident that with the construction shown an increase in pressure in pipe 11' sufficient to overcome the force of spring 190 will raise the plunger 188 and close connection between contact member 192 and 193, causing operation of the signal device 194, and the repeated operation of said signal device will serve to indicate an excessive deviation of the drill from the vertical.

Other forms of detecting devices may also be employed for operating the valve means or for otherwise varying the resistance to flow of circulating fluid through the drill pipe. For example, as shown in Figs. 17 to 19 inclusive, the valve may be operable by a spring instead of by an electric motor and may be normally held in open position by catch means which are releasable upon completion of a control circuit such as above described. In this case the detecting apparatus 22a comprises an upper section 24a which may as before contain a plurality of dry cells 26, and a lower section 25a containing suitable circuit closing means which may for example be the same as those above described and may be similarly operated by means of weight 97. The valve is shown as comprising a beveled valve member 200 biased as by means of spring 204 toward engagement with a valve seat 201 around an opening 202 in partition wall 203 which extends across inside the enlarged lower portion 78a of the casing section 25a. The wall of casing section 25a is provided with openings 205 above the partition wall 203, so that when the valve member 200 is held in raised or open position the circulating fluid from the annular space 19' may pass downwardly through said openings 205 and through the opening 202. Said valve may be normally held in raised position by catch means indicated at 206 and comprising two catch members 207 pivoted independently at 208 and having their lower ends extended inwardly to form prongs 209 adapted to engage beneath the head 210 of the stem 211 of valve member 200. Said stem is slidably mounted in bearings 212 in the lower end wall 213 of casing section 25a and in a partition wall 214, one or both of said bearing means being provided with a packing gland such as indicated at 215. Each of the catch members 207 may be provided with an arm 216 formed as an armature of soft iron and extending opposite the two pole members 217 of a U-shaped soft iron core 218 upon whose arms are mounted electromagnetic coils 219. The core 218 and coils 219 may be supported in fixed position within the casing in any suitable manner as by means of a bar 220. Suitable means such as spring 221 are provided, tending to hold the catch members 207 inwardly with their prongs 209 engaged beneath the valve stem head 210. In this case the electric circuit comprises as before a wire 161 leading from the battery to binding post 162 and a wire 164 leading from said binding post to the binding post 120 at one end of the series of contact members. The binding post 121 at the other end of the series of contact members is connected by wire 223 extending downwardly in groove 224 in the wall of the casing, to one end of one of the coils 219. Said coils are connected in series by means of wire 225, while the other end of the second coil may be electrically connected to the casing in any suitable manner, as by means of wire 226 leading to one of the catch members 207 which are in electrical connection with the casing. The circuit is completed as before through the casing to the upper end of the dry cells 26.

In the use of this form of detecting device, operation of weight 97 to close connection between all of the contact members, due to deviation of the device from the vertical, will complete the above described electric circuit through coils 219, thus energizing said coils and causing arms 216 to be drawn upwardly against the pole pieces 217, thus removing prongs 209 from engagement with valve stem head 210 and permitting valve member 200 to be moved to closed position by means of spring 204. In this case there is no repeated opening and closing of the valve member, as said valve member is simply moved once to closed position (or to position of increased resistance to flow of circulating fluid as it is not necessary that the valve close completely upon such movement) and remains in such position until the drill is removed from the hole and the device is reset by pushing the valve upwardly until the head 210 is again caught between the catch members 207. This form of the invention, however, may have certain advantages in some cases, due to its simplicity and to the small amount of current required for operation thereof.

Any of the forms of indicating, recording, or signalling means above described may be employed for detecting at the surface the increase in pressure in the circulating fluid, in connection with the valve operating means just described. A particularly advantageous means for detecting such increased pressure in connection with this form of apparatus, however, is shown in Fig. 21. A pressure operated switch 185, of the same type as shown in Fig. 20, is connected as before to the pipe 11' and is provided with contact means 192 and 193 connected in an electric circuit including battery 195 and relay magnet 228. Said relay magnet is adapted upon energization to break the circuit between contact means 229 which may be included in the electric circuits of motors 230 and 231 which operate the drill and the fluid circulating pump respectively.

By the use of the arrangement above described, the increase in pressure due to increased resistance to the flow of the circulating fluid causes the pressure operated switch 185 to close connection between contact members 192 and 193 and energize relay magnet 228, thus breaking the operating circuits of the electric motors above mentioned and stopping operation of both the drill and the fluid circulating pump. The device therefore functions in this case not only to give an indication of the deviation but to positively stop operation of the drill until the deviation is corrected or until the operating circuits of said motors are otherwise established. As above stated this circuit opening device is particularly advantageous in connection with the deviation detecting apparatus shown in Fig. 17, which provides for a permanent increase in pressure in the drill pipe, but it is evident that it may also be used in connection with the form of deviation detecting apparatus shown in Fig. 2 or with any of the other forms of such apparatus herein described.

In a similar manner, if steam power is employed for operating the drill and pump, the pressure in the circulating fluid may be utilized to shut off the steam supply.

A particularly advantageous form of deviation detecting apparatus, in which the valve is operated to closed or partially closed position by spring means in a manner similar to that shown in Fig. 17, but in which means are provided for automatically re-opening the valve by the action of the pressure of the circulating fluid itself, so as to cause repeated closing and opening of the valve so long as the deviation continues, is illustrated in Figs. 22 to 26 inclusive. The deviation detecting apparatus 22b is in this case shown as mounted in a special section of pipe 235, although it is understood that it may if desired be mounted within an ordinary section of drill pipe in a similar manner as the apparatus shown in Fig. 2 and also that any of the other forms of deviation detecting apparatus may, if desired, be mounted in a special pipe section in the manner illustrated in Fig. 22. The casing of the detecting apparatus is shown as comprising an upper section 236, an intermediate section 237, and a lower section 238. A flange 239 at the upper end of said casing is secured as by means of bolts 240 to a flange 242 extending inwardly from the pipe section 235. The lower end of the device may be centered in any suitable manner as by means of arms or lugs 243 projecting inwardly from pipe 235 and leaving openings therebetween for passage of the circulating fluid. The upper and lower ends of pipe section 235 may be provided with coupling means or tool joint members 244 and 245 whereby the same may be connected between two standard sections of drill pipe or between the lowermost section of drill pipe and the bit. The three casing sections 236, 237 and 238 are threadedly connected to one another and suitable gasket means may be provided therebetween for maintaining fluid tight connections. The dry cells 26 are shown as mounted within the intermediate section 237 which is provided with upper and lower end walls 247 and 248. The lowermost terminal of said dry cells rests upon binding post 249 which is mounted upon and insulated from the lower end wall 248, while the binding post 250, which extends through and is insulated from the upper end wall 247, is provided with a spring contact 251 engaging the uppermost terminal of said dry cells. The circuit closing means, which may for example be of the same type as above described, and operated as before by means of weight 97, may conveniently be mounted as shown in the lowermost casing section 238. The binding post 249 is shown as connected by wire 252 to one end of the series of contact means while the other end of said series of contact means is electrically connected to the wall of the casing as by wire 253, so as to include the several contact members in series in the same manner as before.

The upper casing section 236 is open at its upper end as shown at 255, and an intermediate partition wall 256 is provided at a suitable distance below said upper end. A cylindrical valve member 257 is mounted to slide up and down within the casing 236 above said partition wall and is provided with ports 258 normally registering with ports 259 in the wall of the casing and is also provided with a stem 261 extending through the partition 256 and having an enlarged head 262 at its lower end. In order to maintain the pressure inside the casing section 236 equal to the pressure outside the same, I prefer to provide a pressure equalizing plug 263 making a snug sliding fit in an opening 264 in partition wall 256, and openings 265 in the wall of the casing above said partition. Said openings 265 may advantageously be disposed somewhat above the bottom of valve member 257 when in its lowermost position, as shown, for a reason hereinafter explained. A spring 266 is rigidly secured at its upper end to the partition wall 256 as shown at 267 and is rigidly secured at its lower end to valve stem 261 as indicated at 268, and is adapted to exert both an upward tension and a torque on said valve stem, the torque thereof being in a counter-clockwise direction in Fig. 23. Upward movement of the valve to closed position is normally prevented by catch members 207 normally held in engagement with the valve stem head 262 by means of springs 221b but which are operable to position to release said valve stem head by means of electromagnetic coils 219, the construction and mode of operation of catch members 207 and electromagnetic coils 219 being substantially the same as in the form of the invention shown in Figs. 17 and 18. One end of the winding of coils 219 is connected by wire 270 to the casing or to supporting bar 220, while the other end of said winding is connected by wire 271 to the binding post 250.

It is evident that with the construction above described raising of valve member 257 by the action of spring 266 will move the ports 258 therein out of register with ports 259 and thus wholly or partially restrict the flow of circulating fluid. The resulting increase in pressure above the valve member will then tend to return the same to open position, and suitable means are provided for causing rotation of said valve member during the first portion of such return movement, to such position that the ports 258 will lie in angular positions wholly out of register with the positions of ports 259, so that in the further return movement of the valve, in which said ports 258 are moved vertically into alignment with ports 259, the ports will still remain out of register with one another, thus preventing release of the circulating fluid therethrough and causing the required pressure in the circulating fluid above the valve member to be maintained until the valve member is lowered to position to permit reengagement of the catch member 207 over the valve stem head 262 in case such catch members are in proper position for such engagement, and means are further provided for then automatically rotating the valve back to its initial angular position, so as to bring said ports into register. This automatic operation of the valve may be accomplished in a number of ways, but the means which I have shown for this purpose comprises a cam groove formed in the outer face of valve member 257 and including a vertical portion 275 of a length substantially equal to the desired upward movement of the valve member, a portion 276 inclined upwardly from the lower end of said vertical portion, a second vertical portion 277 extending upwardly from the upper end of said inclined portion, and a portion 278 which may be approximately horizontal but which is preferably inclined somewhat downwardly from the upper end of the last named vertical portion 277 to the upper end of the first named vertical portion 275, and a pin or stud 279 projecting inwardly from the wall of casing section 236 and engaging in said cam groove. The position of said stud relative to said groove is such that when the valve is in its normal open position, that is, with the ports 258 in full register with ports 259, said pin is at or near the upper end of the vertical portion 275 of said groove. The angular distance between the vertical portions 275 and 277 is equal to or somewhat greater than the angle through which valve member 257 must be rotated in order to move the ports 258 wholly or substantially out of register with the ports 259. A dog 281, pivotally mounted at 282 adjacent the junction of the groove portions 275 and 276 normally extends across the groove 275 and is held in such position and against the opposing wall of said groove by means of spring 283. Said dog, however, is adapted to be moved downwardly by pin 279, so as to permit passage of said pin below said dog, and sufficient space is provided for said pin to pass completely beyond said dog whereupon said dog returns to normal position and prevents said pin from returning in the vertical groove 275. The lower face of dog 281 and spring 283 conforms substantially to the inclination of the groove portion 276. A leaf spring 285 may also be provided at the lower side of the groove portion 278, so as to permit movement of the pin through said groove portion only in a direction from right to left in Fig. 24 and prevent movement thereof in the reverse direction. The above references to movement of the pin 279 are understood to mean only relative movement thereof, for it is in fact the valve member and the cam groove which move while the pin 279 remains relatively stationary, except of course for the rotary movement thereof with the drill pipe.

In order to prevent the valve member 257 from being immediately forced upwardly again by spring 266 after the completion of each upward and downward movement thereof, any desired number of detent springs 290 may be mounted on the interior of the wall of casing section 236, said detent springs being forced inwardly into engagement with notches 291 on the valve member when said valve member is in normal open position, as shown in Fig. 24. The resistance offered by said detent springs against upward movement of the valve member is somewhat less than the upward force of spring 266, but is sufficient to prevent upward movement of the valve by said spring, following a complete operation thereof, until the pressure in the circulating fluid above the valve has again decreased due to resumption of flow of circulating fluid through the valve ports following return of the valve member to open position, as hereinafter described.

In the operation of this form of the invention, excessive deviation of the drill pipe from the vertical will serve as before to complete an electric circuit leading from dry cells 26 through binding post 249 and wire 252 to the series of contact members, thence by wire 253 to the metallic casing, through said casing and supporting bar 220 to wire 270, thence through the electromagnetic coils 219 and through wire 271, binding post 250, and spring contact 251 back to the dry cells. The resulting energization of coils 219 will cause outward movement of catch members 207, so as to release the valve stem head 262 therefrom. As the pressure in the circulating fluid above the valve member at this time exceeds the pressure below the valve member only by the small pressure difference required to force the circulating fluid through the valve ports, the upward tension of spring 266 is sufficient to overcome the resistance of detent springs 290 and immediately force the valve member 257 upwardly, so as to bring the ports 258 out of register with ports 259. In such upward movement of the valve member the vertical groove portion 275 moves upwardly over the pin 279, and the dog 281 also passes over said pin. The upward movement of the valve is arrested by engagement of the lower end of groove portion 275 with pin 279. The position of the valve member at this time is shown in Fig. 25.

As soon as the valve ports are moved out of register the pressure in the circulating fluid above the valve will begin to increase until it exceeds the pressure beneath the valve by an amount sufficient to overcome the strength of spring 266, when the valve member will be forced to descend. In such downward movement of the valve member the engagement of the inclined groove portion 276 with pin 279 will cause the valve member to rotate against the torque of spring 266 until the valve member reaches the position shown in Fig. 26, at which time the ports 258 are at such angular positions, as to prevent register thereof with ports 259. The valve member then moves vertically downward during which time engagement of the vertical groove portion 277 with pin 279 serves to hold the valve member in rotated position. However, when the upper end of groove 277 reaches the position of pin 279 the torque of spring 266 will immediately rotate the valve member back to its original position, such movement being permitted by the groove portion 278. The purpose of the slight downward inclination which is preferably given to groove portion 278 is to insure that the valve member will be moved downward somewhat beyond its initial position before the return rotation thereof and thus insure engagement of catch members 207 with the valve stem head 262, provided said catch members are in position to so engage the same. This return rotation of valve member 257 again brings the ports 258 and 259 into register with one another and permits the flow of circulating fluid to be resumed.

This return movement of the valve member completes one full operation thereof and brings the notches 291 again into engagement with detent springs 290. The resumption of flow of circulating fluid through the valve ports will cause the pressure above the valve member to immediately begin to decrease, and the function of detent springs 290 is to hold the valve member in lowered position, regardless of the position of catch members 207, until the pressure above the valve member is reduced sufficiently to permit the upward tension of spring 266 to overcome both the difference in pressure and the resistance of said detent springs. The reason for thus delaying upward movement of the valve member until the difference in pressure above and below the same is reduced to a certain value is that if the valve member were permitted to move upward immediately as soon as the pressure difference was diminished sufficiently to be overcome by the upward tension of spring 266, the upward movement of said valve member would be gradual due to gradual diminishing of pressure and said valve member would finally come to rest at some intermediate position in its upward movement where the pressure difference required to force the circulating fluid through the partly closed valve ports would just balance the upward tension of spring 266. However, by reason of the detent springs 290 upward movement of the valve member cannot begin until the upward tension of spring 266 materially exceeds the difference in pressure, and as soon as said detent springs are forced out of notches 291 their resistance becomes practically negligible and the valve member moves upwardly with sufficient rapidity to complete its upward movement before any material increase in pressure in the circulating fluid can take place. The retardation of initiating the upward movement of the valve member may also be assisted by placing the openings 265 somewhat above the bottom of valve member 257 as shown, so that the first part of the upward movement of said valve member can only take place at a rate corresponding to the rate at which the circulating fluid entering through said openings can pass down through the restricted space, indicated at 292, between the valve member and the surrounding wall of the casing into the space below the valve member. However, as soon as the valve member has moved upward sufficiently to uncover the openings 265 this retarding force is removed and said valve member is permitted to complete its upward movement with the necessary rapidity.

Therefore, if the catch members 207 are still held in released position by electromagnets 219, the operation of the valve to closed position and back to open position will be continually repeated, causing the circulating fluid above the valve to alternately increase and decrease, and such fluctuations in pressure may be utilized as before to operate any suitable indicating, recording or warning means responsive to the pressure at the upper end of the drill pipe. On the other hand, if the completion of the control circuit is only temporary, as for example in case of accidental operation of the circuit closing means, the reopening of said circuit will deenergize electromagnets 219 and cause catch members 207 to be returned by springs 221b to such position as to engage the valve stem head 262 upon the next return of the valve to open position, thus preventing further operation of the valve and permitting the normal flow of circulating fluid to continue as before. This form of the invention therefore operates in such manner that even in case of accidental operation of the deviation responsive means to close the control circuit, the indication at the surface will be only momentary and may be readily distinguished from the continually repeated indication corresponding to an actual deviation of the drill pipe. Furthermore, by raising the drill above the point of excessive deviation it is evident that the control circuit will be reopened due to return of the circuit closing members to normal position, and the device will then reset itself for subsequent operation, due to reengagement of the catch members 207 with valve stem head 262 as above described. Drilling may then be resumed at a slower rate, so as to straighten the hole, and it is not necessary to pull out the drill pipe and reset the device in order to make it effective for proper functioning in case of subsequent deviation of the drill pipe. With respect to the advantages above pointed out, this form of the invention is therefore similar to that shown particularly in Figs. 2 to 15 inclusive.

Any of the above described pressure responsive means, or in general any means responsive to variations in head of the circulating fluid, may be provided at the top of the drill hole for giving an indication, record, or warning of the excessive deviation in connection with the last described form of apparatus, and the manner of operation of said indicating, recording or warning means in response to fluctuations in pressure or head of the liquid due to the above described operation of the valve member will be substantially the same as described in connection with the other forms of deviation detecting apparatus.

Still another form of deviation detecting apparatus is shown in Fig. 27. In this case the resistance to flow of circulating fluid and the increase in pressure therein is caused by delivering into the lower portion of the descending column of circulating fluid a quantity of gas under pressure, and the delivery of such gas to the circulating fluid may be caused by operation of suitable deviation responsive means, such as those above described. Referring to Fig. 27 the device is shown as comprising an upper casing section 295 containing a charge of combustible material 296, such as a slow burning powder, an intermediate casing section 297 containing a series of dry cells 26 and a lower casing section 298 containing the circuit closing means and operating weight 97 which may be of the same construction as shown, for example, in Fig. 2. The device may be supported within the drill pipe 6 in any suitable manner as, for example, by engagement of the enlarged lower portion 299 with the tool joint member 301 and by means of adjustable centering arms 302 at the upper end.

The combustible material 296 may be contained in a cartridge 303 consisting, for example, of paper or other material adapted to be ruptured under the pressure resulting from ignition of such material and an igniting fuse 304 is provided within said combustible material. The cap member 305 is provided with openings 306 and 307 establishing communication between the interior of the upper section 295 and the space outside the apparatus and within the drill pipe and with a check valve 308 controlling communication through said openings and normally held in closed position by the pressure of the circulating fluid and also, if desired, by means of a spring 309. The construction of the intermediate and lower casing sections and the mounting of the dry cells and circuit closing means therein may be substantially the same as above described. Openings 311 are provided in the wall of the lower casing section beneath the lower end wall 312 thereof for permitting flow of circulating fluid. The electric control circuit includes wire 313 leading from insulated binding post 314 to an insulated binding post 315, wire 316 leading from said last named binding post to one end of the series of circuit closing members, a connection 317 from the other end of said series of circuit closing members to the wall of the casing, a wire 318 leading from binding post 319, which is also electrically connected to the wall of the casing, to igniting fuse 304, and wire 321 leading from said fuse to insulated binding post 322 which is in connection with the upper end of the series of dry cells.

In the operation of this form of apparatus completion of the electric control circuit causes fuse 304 to ignite the combustible material 296. Said combustible material may be a slow burning powder adapted to support and maintain its own combustion and cause generation of gaseous products of such combustion under sufficient pressure to overcome the pressure of the circulating fluid and open check valve 306. Such gaseous products of combustion will, therefore, be delivered under pressure into the circulating fluid and will increase resistance to flow of the circulating fluid and increase pressure therein. The resulting increase in pressure in the circulating fluid may be utilized for operation of any of the deviation responsive means above described for giving an indication, record, or warning at the surface of the excessive deviation of the drill pipe.

I claim:

1. An apparatus for detecting deviation of rotary drill holes from the vertical comprising, in combination with a rotary drill pipe and with means for causing downward flow of circulating fluid therethrough, valve means mounted within said drill pipe adjacent the lower end thereof and movable between an open position permitting relatively free flow of circulating fluid through said drill pipe and a closed position restricting the flow of such fluid, operating means for repeatedly moving said valve means between open and closed positions, means normally holding said valve means in open position, and means responsive to deviation of the drill pipe from the vertical beyond a certain angle, and only during continued rotation thereof to release said valve holding means and permit movement of said valve by said valve operating means.

2. An apparatus for detecting excessive deviation of rotary drill holes from the vertical comprising, in combination with a rotary drill pipe, and with means for causing downward flow of circulating fluid therethrough, means for repeatedly increasing and decreasing the resistance to flow of circulating fluid through said drill pipe adjacent the lower end thereof whenever the deviation of the drill pipe from the vertical, and only during continued rotation thereof exceeds a certain angle, and means communicating with the upper end of said drill pipe and adapted to give a warning in response to variations in head in the circulating fluid due to such changes in resistance.

3. An apparatus for detecting excessive deviation of rotary drill holes from the vertical comprising, in combination with a rotary drill pipe and means for causing downward flow of circulating fluid therethrough, valve means mounted within the lower portion of the drill pipe for controlling flow of circulating fluid therethrough and movable between relatively open and relatively closed positions, means normally holding said valve means in relatively open position, means operable in response to deviation of said drill pipe from the vertical, and only during continued rotation thereof and adapted to cause repeated movement of said valve means between relatively open and relatively closed positions whenever said deviation exceeds a certain angle and to permit said valve means to return to relatively open position and to be again held in said relatively open position when said deviation again falls below said angle.

4. An apparatus for detecting excessive deviation of rotary drill holes from the vertical comprising, in combination with a rotary drill pipe adapted for downward passage of circulating fluid therethrough, valve means mounted within said drill pipe adjacent the lower end thereof and controlling the flow of circulating fluid therethrough, means tending to move said valve means toward relatively closed position, means normally holding said valve means in relatively open position, means operable upon deviation of said drill pipe from the vertical, and only during continued rotation thereof beyond a certain angle to release said holding means and permit said valve means to move to relatively closed position, so as to cause an increased pressure in the circulating fluid above said valve means, means operable by said increased pressure to return said valve means to relatively open position and cause the pressure in the circulating fluid to again decrease, said valve closing and opening means being adapted to cause repeated closing and opening of said valve as long as said deviation continues.

5. A device of the character described, including: a drill pipe having a tool at its lower end for earth penetration; a rotary power device for rotating said drill pipe; a fluid pressure system for forcing drilling fluid through said drill pipe; valve means in said drill pipe adapted to restrict the flow of fluid through said drill pipe, said valve means operating in response to deflection of said drill pipe from vertical; and a pressure indicator in said pressure system for giving a sensible indication of an increase in the pressure in said fluid pressure system.

6. A device of the character described, including: a drill pipe having a tool at its lower end for earth penetration; a rotary power device for rotating said drill pipe; a fluid pressure system for forcing drilling fluid through said drill pipe; gravity actuated valve means in said drill pipe adapted to restrict the flow of fluid through said drill pipe, said valve means operating in response to deflection of said drill pipe from vertical; and a pressure indicator in said pressure system for giving a sensible indication of an increase in the pressure in said fluid pressure system.

7. A device of the character described, including: a drill pipe having a tool at its lower end for earth penetration; a rotary power device for rotating said drill pipe; a fluid pressure system for forcing drilling fluid through said drill pipe; valve means in said drill pipe adapted to restrict the flow of fluid through said drill pipe; means for automatically closing said valve when said drill pipe has deflected from vertical; and a pressure indicator in said pressure system for giving a sensible indication of an increase in the pressure in said fluid pressure system.

8. A device of the character described, including: a shaft having penetrating means at its lower end; a power device for driving said shaft; and fluid operated means associated with said drill shaft and operating in response to deflection of said shaft in any direction from vertical to give a sensible indication of such deflection.

9. A device of the character described, including: a shaft having penetrating means at its lower end; a power device for driving said shaft; a fluid chamber associated with said shaft; and valve means operable in said chamber by deflection of said shaft from vertical.

10. A device of the character described, including: a shaft having penetrating means at its lower end; a power device for driving said shaft; and a fluid chamber associated with said shaft; and gravity actuated valve means operable in said chamber in response to deflection of said shaft from vertical.

11. A device of the character described, including: a drill pipe having penetrating means at its lower end; a power device for rotating said drill pipe; a pressure providing system; and means associated with said drill pipe and said pressure providing system and operating in response to deflection of the lower end of said drill pipe from vertical to give a sensible indication of such deflection.

12. A device of the character described, including: a drill pipe having penetrating means at its lower end; a power device for rotating said drill pipe; a fluid pressure system; and valve means associated with said drill pipe and operating in response to deflection of said drill pipe from vertical to give a sensible indication through said fluid pressure system of such deflection.

13. A device of the character described, including: a drill pipe having penetrating means at its lower end; a power device for rotating said drill pipe; a column of fluid; and means associated with said drill pipe and operating in response to deflection of said drill pipe from vertical to give a sensible indication through said column of fluid of such deflection.

14. A device of the character described, including: a drill pipe having a tool at its lower end for earth penetration; a power device for rotating said drill pipe; a fluid pressure system for forcing fluid through said drill pipe; and valve means in said drill pipe adapted to restrict the passage of fluid through said drill pipe, said valve means operating in response to deflection of said drill pipe from vertical.

15. A device of the character described, including: a shaft; and a pendulum associated through a ball joint with said shaft for continuously providing a sensible indication of the deflection from vertical of said shaft.

16. A device of the character described, including: a shaft; a pendulum so associated with said shaft that it may move relative to said shaft when said shaft is deflected in any direction from vertical; and means associated with said shaft for continuously providing a sensible indication of the position of said pendulum relative to said shaft.

17. A device of the character described, including: a shaft; a pendulum connected through a ball joint with said shaft, said pendulum being adapted for movement in any direction relative to said shaft; and means associated with said shaft for continuously providing a sensible indication of the position of said pendulum relative to said shaft.

18. A device of the character described, including: a shaft; and a pendulum associated through a ball joint with said shaft for giving a sensible indication of the deflection from vertical of said shaft at a point remote from said deflection.

19. A device of the character described, including: a shaft; and a pendulum associated through a ball joint with said shaft for giving sensible indications of the deflections from vertical of said shaft as said shaft is moved.

20. A device of the character described, including: a shaft; a pendulum so associated with said shaft that it may move relative to said shaft when said shaft is deflected in any direction from vertical; and means associated with said shaft for providing at a point remote from said pendulum a sensible indication of the position of said pendulum relative to said shaft.

21. A device of the character described, including: a supporting member; and fluid operated means associated with said supporting member and operated in response to deflection of said member in any direction from vertical to give a sensible indication of such deflection.

22. A device of the character described, including: a shaft; a fluid chamber associated with said shaft; valve means operable in said chamber by deflection of said shaft from vertical; and means for giving a sensible indication of a change in position of said valve means.

23. A device of the character described, including: a shaft; a pressure providing system; and means associated with said shaft and said pressure providing system and operating in response to deflection of the lower end of said shaft from vertical to give a sensible indication of such deflection.

24. A device of the character described, including: a pipe; a fluid pressure system for forcing fluid through said pipe; valve means in said pipe adapted to restrict the flow of fluid through said pipe, said valve means operating in response to deflection of said pipe from vertical; and a pressure indicator in said pressure system for giving a sensible indication of an increase in the pressure in said fluid pressure system.

JOHN J. JAKOSKY.